United States Patent
Stephens et al.

(10) Patent No.: US 9,462,504 B2
(45) Date of Patent: Oct. 4, 2016

(54) TRANSMIT TIME OFFSET IN UPLINK MULTI-USER MULTIPLE INPUT-MULTIPLE OUTPUT SYSTEM

(71) Applicant: Intel IP Corporation, Santa Clara, CA (US)

(72) Inventors: Adrian P. Stephens, Cottenham (GB); Robert J. Stacey, Portland, OR (US); Thomas J. Kenney, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 20 days.

(21) Appl. No.: 14/315,562

(22) Filed: Jun. 26, 2014

(65) Prior Publication Data

US 2015/0139090 A1    May 21, 2015

Related U.S. Application Data

(60) Provisional application No. 61/906,059, filed on Nov. 19, 2013, provisional application No. 61/973,376, filed on Apr. 1, 2014, provisional application No. 61/976,951, filed on Apr. 8, 2014, provisional application No. 61/986,256, filed on Apr. 30, 2014, provisional application No. 61/986,250, filed on Apr. 30, 2014, provisional application No. 61/991,730, filed on May 12, 2014.

(51) Int. Cl.
| | |
|---|---|
| *H04W 52/24* | (2009.01) |
| *H04W 28/06* | (2009.01) |
| *H04B 7/04* | (2006.01) |
| *H04W 52/26* | (2009.01) |
| *H04W 16/14* | (2009.01) |
| *H04W 52/42* | (2009.01) |
| *H04W 74/00* | (2009.01) |

(Continued)

(52) U.S. Cl.
CPC ........... *H04W 28/06* (2013.01); *H04B 7/0452* (2013.01); *H04W 16/14* (2013.01); *H04W 52/241* (2013.01); *H04W 52/267* (2013.01); *H04W 52/42* (2013.01); *H04W 74/006* (2013.01); *H04W 52/346* (2013.01); *H04W 56/00* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 7,809,020 B2 | 10/2010 | Douglas et al. | |
| 9,325,463 B2 | 4/2016 | Azizi et al. | |

(Continued)

FOREIGN PATENT DOCUMENTS

| | | | |
|---|---|---|---|
| KR | 1020110044938 A | 5/2011 | |
| KR | 102012012767 A | 11/2012 | |

(Continued)

OTHER PUBLICATIONS

"(Discussion on potential techniques for HEW", IEEE 802.11-13, 0871 rO), (Jul. 15, 2013), 13 pgs.

(Continued)

*Primary Examiner* — Kodzovi Acolatse
(74) *Attorney, Agent, or Firm* — Schwegman Lundberg & Woessner, P.A.

(57) ABSTRACT

A method for transmit time offset in a UL-MU-MIMO system monitors respective transmit powers, over a wireless channel, for a plurality of stations in the system. A respective transmit time offset is determined for each station in response to the respective transmit power of each station. A poll exchange sequence is initiated in which the transmit time offsets are transmitted to each respective station. An access point can then receive data from the stations at times adjusted by the respective transmit time offsets.

20 Claims, 3 Drawing Sheets

(51) Int. Cl.
*H04W 84/12* (2009.01)
*H04W 52/34* (2009.01)
*H04W 56/00* (2009.01)

(56) References Cited

U.S. PATENT DOCUMENTS

| | | | |
|---|---|---|---|
| 2005/0135410 A1* | 6/2005 | Stephens | H04W 74/06 370/449 |
| 2005/0276347 A1 | 12/2005 | Mujtaba et al. | |
| 2006/0018249 A1 | 1/2006 | Shearer et al. | |
| 2006/0030322 A1 | 2/2006 | Kim et al. | |
| 2006/0062314 A1 | 3/2006 | Palin et al. | |
| 2006/0067415 A1 | 3/2006 | Mujtaba | |
| 2007/0147226 A1 | 6/2007 | Khandekar et al. | |
| 2008/0240018 A1 | 10/2008 | Xue et al. | |
| 2008/0240275 A1 | 10/2008 | Cai | |
| 2010/0046671 A1 | 2/2010 | Sadri et al. | |
| 2010/0110804 A1 | 5/2010 | Yeh | |
| 2010/0157956 A1 | 6/2010 | Takahashi | |
| 2010/0260159 A1 | 10/2010 | Zhang et al. | |
| 2010/0322166 A1* | 12/2010 | Sampath | H04W 72/121 370/329 |
| 2011/0026623 A1 | 2/2011 | Srinivasa et al. | |
| 2011/0032850 A1 | 2/2011 | Cai | |
| 2011/0268094 A1* | 11/2011 | Gong | H04W 72/1289 370/338 |
| 2012/0002756 A1 | 1/2012 | Zhang et al. | |
| 2012/0106481 A1 | 5/2012 | Cho et al. | |
| 2012/0155444 A1 | 6/2012 | Chiueh et al. | |
| 2012/0320890 A1 | 12/2012 | Zhang et al. | |
| 2013/0070642 A1* | 3/2013 | Kim | H04W 72/0413 370/254 |
| 2013/0230035 A1* | 9/2013 | Grandhi | H04W 48/16 370/338 |
| 2013/0258975 A1 | 10/2013 | Krishnamurthy et al. | |
| 2013/0286959 A1* | 10/2013 | Lou | H04W 72/04 370/329 |
| 2014/0211775 A1 | 7/2014 | Sampath et al. | |
| 2014/0269544 A1* | 9/2014 | Zhu | H04L 1/1671 370/329 |
| 2014/0307650 A1 | 10/2014 | Vermani et al. | |
| 2015/0063255 A1 | 3/2015 | Tandra et al. | |
| 2015/0063318 A1* | 3/2015 | Merlin | H04L 47/12 370/336 |
| 2015/0085836 A1* | 3/2015 | Kang | H04W 74/0808 370/336 |
| 2015/0117428 A1 | 4/2015 | Lee, II et al. | |
| 2015/0131756 A1 | 5/2015 | Suh et al. | |
| 2015/0139118 A1 | 5/2015 | Azizi et al. | |
| 2015/0139119 A1 | 5/2015 | Azizi et al. | |
| 2015/0139206 A1 | 5/2015 | Azizi et al. | |
| 2015/0237531 A1* | 8/2015 | Hao | H04W 28/24 370/328 |

FOREIGN PATENT DOCUMENTS

| | | |
|---|---|---|
| TW | 201349815 A | 12/2013 |
| TW | 201540029 A | 10/2015 |
| TW | 201540118 A | 10/2015 |
| TW | 201541889 A | 11/2015 |
| WO | WO-2012057547 A2 | 5/2012 |
| WO | WO-2013055117 A2 | 4/2013 |
| WO | WO-2015076917 A1 | 5/2015 |
| WO | WO-2015076923 A1 | 5/2015 |
| WO | WO-2015077042 A1 | 5/2015 |
| WO | WO-2015077049 A1 | 5/2015 |
| WO | WO-2015077068 A1 | 5/2015 |
| WO | WO-2015077096 A1 | 5/2015 |

OTHER PUBLICATIONS

"11ah Preamble for 2Mhz and Beyond", IEEE Submission No. IEEE 802.1-11/1483r2, 1-24.

"U.S. Appl. No. 14/338,137, Notice of Allowance mailed Nov. 25, 2015", 14 pgs.

"U.S. Appl. No. 14/458,000, Non Final Office Action mailed Dec. 3, 2015", 16 pgs.

"Guard interval estimation considering switch time and propagation delay", R1-134362, 3GPP TSG RAN WG1 Meeting #74bis, (Oct. 2013).

"International Application Serial No. PCT/US2014/055996, International Search Report mailed Dec. 17, 2014", 3 pgs.

"International Application Serial No. PCT/US2014/055996, Written Opinion mailed Dec. 17, 2014", 5 pgs.

"International Application Serial No. PCT/US2014/056819, International Search Report mailed Dec. 31, 2014", 3 pgs.

"International Application Serial No. PCT/US2014/056819, Written Opinion mailed Dec. 31, 2014", 6 Pgs.

"International Application Serial No. PCT/US2014/064350, International Search Report mailed Feb. 6, 2015", 4 pgs.

"International Application Serial No. PCT/US2014/064350, Written Opinion mailed Feb. 6, 2015", 5 pgs.

"International Application Serial No. PCT/US2014/064509, International Search Report mailed Feb. 11, 2015", 3 pgs.

"International Application Serial No. PCT/US2014/064509, Written Opinion mailed Feb. 11, 2015", 8 pgs.

"International Application Serial No. PCT/US2014/064767, International Search Report mailed Feb. 26, 2015", 8 pgs.

"International Application Serial No. PCT/US2014/064767, Written Opinion mailed Feb. 26, 2015", 8 pgs.

"International Application Serial No. PCT/US2014/065166, International Search Report mailed Jan. 22, 2015", 3 pgs.

"International Application Serial No. PCT/US2014/065166, Written Opinion mailed Jan. 22, 2015", 6 pgs.

Choi, Jinsoo, "Discussion on OFDMA in HEW", In: IEEE P802.11—High Efficiency WLAN Study Group, (Nov. 11, 2013), 11 pgs.

Chun, Jinyoung, et al., "Legacy Support on HEW frame structure", IEEE 11-13/1057r0, (Sep. 16, 2013), 8 pgs.

Chun, Jinyoung, et al., "Uplink multi-user transmission", In: IEEE P802.11—High Efficiency WLAN Study Group, (Nov. 11, 2013), 18 pgs.

Hiertz, Guido R, et al., "Proposed direction and priorities for HEW", In: IEEE P802.11—High Efficiency WLAN Study Group, (Nov. 12, 2013), 17 pgs.

Katsuo, Yunoki, et al., "Access Control Enhancement", doc.:IEEE II-13/1073r1, [Online]. Retrieved from the Internet: <https://mentor.ieee.org/802.11/documents?is_dcn=1073>, (Sep. 18, 2013), 1-9.

Koskela, Timo, et al., "Discussion on Potential Techniques for HEW", In: IEEE P802.11—High Efficiency WLAN Study Group, (Jul. 15, 2013), 13 pgs.

Oh, Jinhyung, et al., "Distributed implicit interference alignment in 802.11ac WLAN network", International Conference on ICT Convergence (ICTC), (Oct. 2013), 421-426.

\* cited by examiner

TRANSMIT TIME OFFSET IN UPLINK MULTI-USER MULTIPLE INPUT-MULTIPLE OUTPUT SYSTEM

PRIORITY CLAIM

This application claims the benefit of priority under 35 U.S.C. 119(e) to: U.S. Provisional Patent Application Ser. No. 61/973,376 filed Apr. 1, 2014 , to U.S. Provisional Patent Application Ser. No. 61/976,951 filed Apr. 8, 2014, to U.S. Provisional Patent Application Ser. No. 61/906,059 filed Nov. 19, 2013, to U.S. Provisional Patent Application Ser. No. 61/986,256, filed Apr. 30, 2014, to U.S. Provisional Patent Application Ser. No. 61/986,250 , filed Apr. 30, 2014, and to U.S. Provisional Patent Application Ser. No. 61/991, 730, filed May 12, 2014, each of which is incorporated herein by reference in its entirety.

TECHNICAL FIELD

Embodiments described herein generally relate to wireless networks. Some embodiments relate generally to improved efficiency and throughput in wireless networks. Some embodiments relate to High-Efficiency Wireless LAN or High Efficiency Wi-Fi (HEW) and the IEEE 802.11ax standard.

BACKGROUND

IEEE 802.11 defines a plurality of standards for wireless communication between stations and access points (AP). One such standard may include uplink multi-user multiple input-multiple output (UL-MU-MIMO) as a feature to improve efficiency and throughput in wireless local area networks (LANs).

After an AP sends out a poll, the timing of responses from the individual stations is variable. The stations also have different transmit power and link attenuation due to different distances and locations of the stations. If a receiver receives an UL-MU-MIMO transmission in which the first received signal is at a significantly lower power than one or more subsequent signals and is offset by a significant time, the acquisition success of the entire assemblage of packets is damaged. In other words, a weaker initial Physical Layer Convergence Procedure (PLCP) Protocol Data Unit (PPDU) can cause a stronger subsequent PPDU to be dropped.

There are general needs to improve packet acquisition in High Efficiency Wi-Fi.

DETAILED DESCRIPTION

Subsequently described embodiments refer to WiFi communication systems and Institute of Electrical and Electronics Engineers (IEEE) 802.11 (i.e., a set of physical layer standards for implementing wireless local area network (WLAN) computer communication). However, the present embodiments are not restricted to only a WiFi communication system or any particular communication standard.

The term "access point" (AP) is used subsequently to refer to a wireless base station that may refer to any fixed transceiver apparatus that communicates using one or more particular radio technologies. For example, the AP may refer to a transceiver communicating using one or more of the IEEE 802.11 standards (e.g., WiFi).

Figure 1:
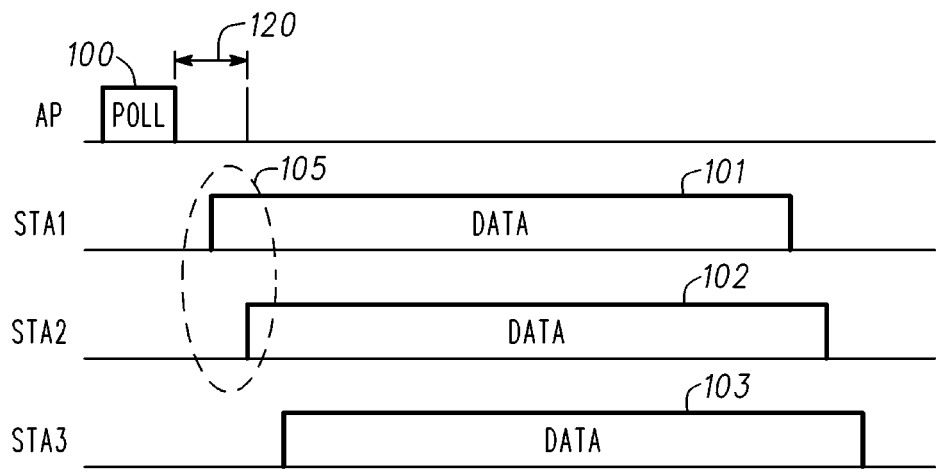
FIG. 1 illustrates a diagram of an AP poll and station response in a wireless system.

FIG. 1 illustrates a diagram of a AP poll and station response in a wireless system. The AP sends out a polling frame 100 to which each of the stations (STA1, STA2, STA3) reply. The short interframe space (SIFS) 120 is shown. As known by one skilled in the art, the SIFS is the time interval between the poll 100 and its acknowledgement from the stations STA1-STA3. The relative heights of each of the data replies 101-103 represent a relative received power of each of the data replies 101-103 at the AP (e.g., receiver). The reply 101 from STA1 is shown having a reduced power reply as compared to the other stations STA2, STA3. This may result in undesirable scenarios of reduced acquisition success 105.

Detection of the first arriving, weaker signal 101 may be missed and the AP may set its symbol timing on the stronger signals 102-103. This may result in the weaker signal potentially causing significant inter-carrier interference to the other stronger signals. Additionally, the AP may set its symbol timing based on the earlier weaker signal 101 and, thus, may not correctly set the timing based on the composite timing of all of the signals 101-103. This may again result in increased inter-carrier interference and packet degradation or loss of packets.

The subsequently disclosed embodiments modify the nominal response time for each station based on its power at the AP. The AP may transmit a respective modified response time to each station based on a previously determined signal-to-noise ratio (SNR) of the link between the AP and each station.

Figure 2:
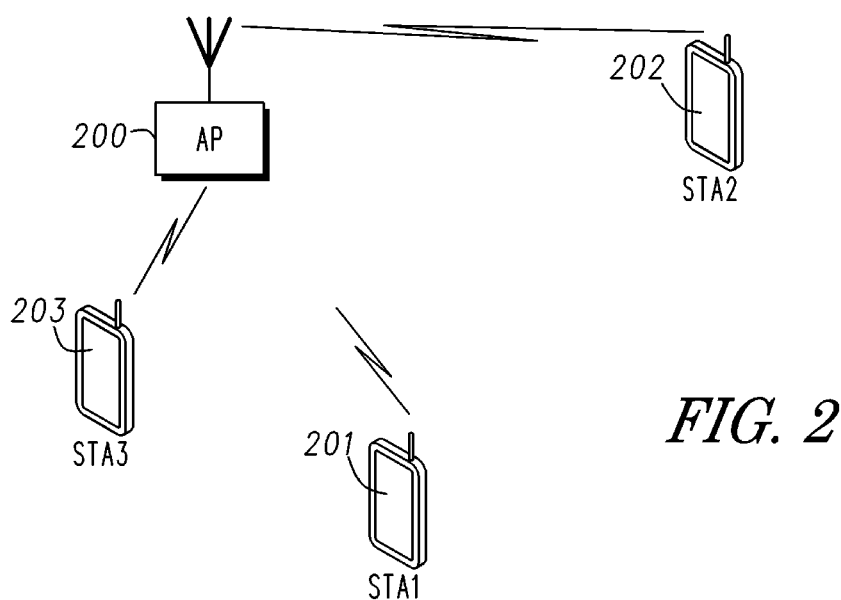
FIG. 2 illustrates various network elements of a wireless communication system in accordance with some embodiments.

FIG. 2 illustrates various network elements of a wireless communication system in accordance with some embodiments. The wireless communication system includes a plurality of wireless communication stations 200-203 that may include one or more mobile wireless stations 201-203 and one or more access points (APs) 200. The wireless communication stations 200-203 may communicate over one or more wireless channels in accordance with IEEE 802.11 communication techniques. In an embodiment, the stations 200-203 may be considered part of the wireless communication system when they are registered with the AP 200.

In accordance with some IEEE 802.11ax (High-Efficiency Wi-Fi (HEW)) embodiments, an AP may operate as a master station which may be arranged to contend for a wireless medium (e.g., during a contention period) to receive exclusive control of the medium for an HEW control period (i.e., a transmission opportunity (TXOP)). The master station may transmit an HEW master-sync transmission at the beginning of the HEW control period. During the HEW control period, HEW stations may communicate with the master station in accordance with a non-contention based multiple access technique. This is unlike conventional Wi-Fi communications in which devices communicate in accordance with a contention-based communication technique, rather than a multiple access technique. During the HEW control period, the master station may communicate with HEW stations using one or more HEW frames. During the HEW control period, legacy stations refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station may also communicate with legacy stations in accordance with legacy IEEE 802.11 communication techniques. In some embodiments, the master station may also be configurable to communicate with HEW stations outside the HEW control period in accordance with legacy IEEE 802.11 communication techniques, although this is not a requirement.

In some embodiments, the links of an HEW frame may be configurable to have the same bandwidth and the bandwidth may be one of 20 MHz, 40 MHz, or 80 MHz contiguous bandwidths or an 80+80 MHz (160 MHz) non-contiguous bandwidth. In some embodiments, a 320 MHz contiguous bandwidth may be used. In some embodiments, bandwidths of 5 MHz and/or 10 MHz may also be used. In these embodiments, each link of an HEW frame may be configured for transmitting a number of spatial streams.

The mobile wireless station 100 may be a mobile communication device that is non-stationary. Such a communication device may include mobile radiotelephones, tablet computers, lap top computers, and other communication devices that may communicate with the AP's 102-104 over one or more wireless channels using a communication technique (e.g., IEEE 802.11ax).

The AP 200 may have a fixed location and may be part of a stationary network that may be coupled to a larger network (e.g., local area network (LAN), wide area network (WAN)). For example, the AP 200 may be part of a wired network that is coupled to the Internet. The mobile wireless stations 201-203 may then access the larger network by communicating over the wireless channels with the AP 200.

Figure 3:
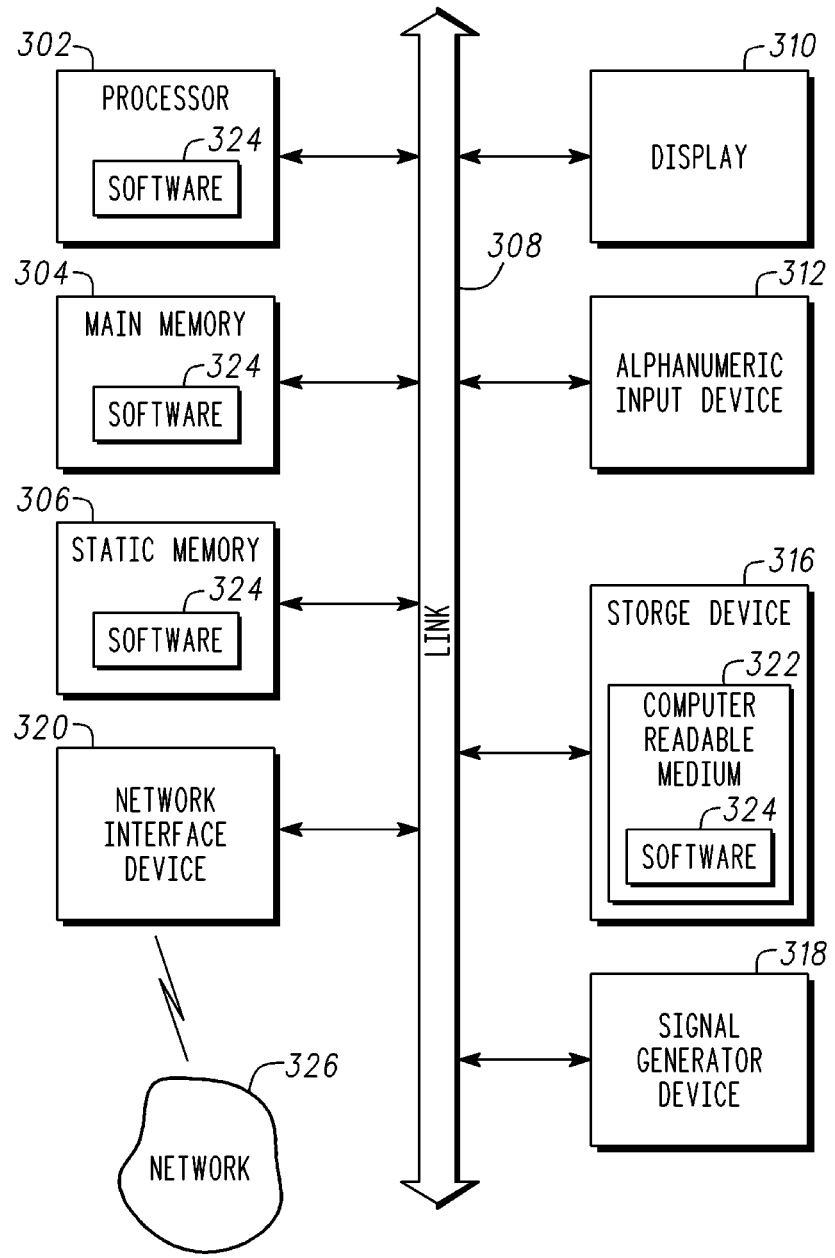
FIG. 3 illustrates a block diagram of a wireless communication device.

FIG. 3 is a block diagram illustrating a wireless communication device 300, within which a set or sequence of instructions may be executed to cause the device to perform any one of the methodologies discussed herein, according to an example embodiment. In alternative embodiments, the device operates as a standalone device or may be connected (e.g., networked) to other devices. In a networked deployment, the device may operate in the capacity of either a server or a client device in server-client network environments, or it may act as a peer device in peer-to-peer (or distributed) network environments. The device may be a mobile communication device (e.g., cellular telephone), an access point, a computer, a personal computer (PC), a tablet PC, a hybrid tablet, a personal digital assistant (PDA), or any device capable of executing instructions (sequential or otherwise) that specify actions to be taken by that device. Further, while only a single device is illustrated, the term "device" shall also be taken to include any collection of devices that individually or jointly execute a set (or multiple sets) of instructions to perform any one or more of the methodologies discussed herein. Similarly, the term "processor-based system" shall be taken to include any set of one or more devices that are controlled by or operated by a processor (e.g., a computer) to individually or jointly execute instructions to perform any one or more of the methodologies discussed herein.

Example wireless station 300 includes at least one processor 302 (e.g., a central processing unit (CPU), a graphics processing unit (GPU) or both, processor cores, compute nodes, etc.), a main memory 304 and a static memory 306, which communicate with each other via a link 308 (e.g., bus). The wireless station 300 may further include a display unit 310 and an alphanumeric input device 312 (e.g., keyboard, keypad). In one embodiment, the display unit 310 and input device 312 are incorporated into a touch screen display. The wireless station 300 may additionally include a storage device 316 (e.g., a drive unit), a signal generation device 318 (e.g., a speaker), a network interface device 320, and one or more sensors (not shown).

The storage device 316 includes a computer-readable medium 322 on which is stored one or more sets of data structures and instructions 324 (e.g., software) embodying or utilized by any one or more of the methodologies or functions described herein. The instructions 324 may also reside, completely or at least partially, within the main memory 304, static memory 306, and/or within the processor 302 during execution thereof by the wireless station 300, with the main memory 304, static memory 306, and the processor 302 also constituting computer-readable media. Embodiments may be implemented in one or a combination of hardware, firmware, or software. Embodiments may also be implemented as instructions stored on a computer-readable storage device, which may be read and executed by at least one processor to perform the operations described herein. A computer-readable storage device may include any non-transitory mechanism for storing information in a form readable by a device (e.g., a computer).

While the computer-readable medium 322 is illustrated in an example embodiment to be a single medium, the term "computer-readable medium" may include a single medium or multiple media (e.g., a centralized or distributed database, and/or associated caches and servers) that store the one or more instructions 324. The term "computer-readable medium" shall also be taken to include any tangible medium that is capable of storing, encoding or carrying instructions for execution by the device and that cause the device to perform any one or more of the methodologies of the present disclosure or that is capable of storing, encoding or carrying data structures utilized by or associated with such instructions. The term "computer-readable medium" shall accordingly be taken to include, but not be limited to, solid-state memories, and optical and magnetic media. Specific examples of computer-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 324 may further be transmitted or received over a communications network 326 using a transmission medium via the network interface device 320 (e.g., radio) utilizing any one of a number of well-known transfer protocols (e.g., HTTP). Examples of communication networks include a local area network (LAN), a wide area network (WAN), a wireless local area network (WLAN) the Internet, mobile telephone networks, plain old telephone (POTS) networks, and wireless data networks (e.g., WiFi (IEEE 802.11), 3GPP, 4G LTE/LTE-A or WiMAX networks). The term "transmission medium" shall be taken to include any intangible medium that is capable of storing, encoding, or carrying instructions for execution by the device, and includes digital or analog communications signals or other intangible medium to facilitate communication of such software. The network interface device may include one or more antennas for communicating with the wireless network.

Figure 4:
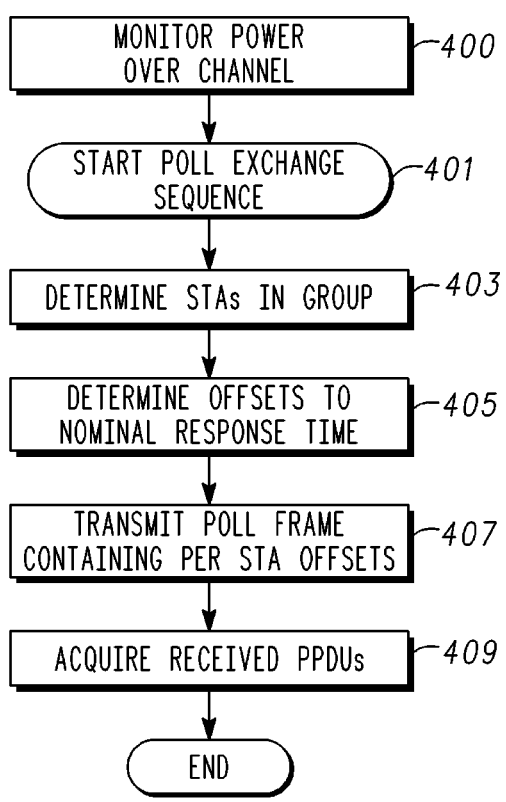
FIG. 4 illustrates a flowchart of an embodiment of a method for transmit time offset in an AP of an UL-MU-MIMO wireless system.

FIG. 4 illustrates a flowchart of an embodiment of a method for transmit time offset in an AP of an UL-MU-MIMO wireless system. The AP (e.g., receiver) monitors the power it receives, from transmissions of its wireless stations, over the wireless channel 400. This may be accomplished by the AP determining a signal-to-noise ratio (SNR) for each received station transmission. The AP may then store this information for future use.

The AP transmits a poll frame in order to initiate an exchange sequence 401. The AP may transmit the poll frame that identifies the responding station(s) and solicits a response. This frame may also be used for scheduling the stations' responses and providing transmit parameters for the stations to utilize (e.g., modulation, coding, bandwidth). The AP may group the stations together 403 into a response group for the purpose of receiving UL-MU-MIMO transmissions so that the AP may only send one transmission instead of multiple.

The AP may determine a time offset for the nominal response time 405. This time offset may delay the weaker received station signals. This may be accomplished using various methods.

One method for determining the time offset is for the AP to select the station, in the response group, having the strongest received power (e.g., station transmit power) and assign a zero transmit time offset to those stations having a received power relatively close to that strongest station. For example, the AP may assign the zero transmit time offset to the stations with a received power within a predetermined power different (e.g., n dB) of the strongest station response. In an embodiment, if the responses are expected by the AP at 16 µs±10%, the weaker stations may be delayed by 1.6 µs.

The AP may communicate the respective time offsets, from the nominal response time, to each of the responding stations 407 in the station group. For example, this may be accomplished through a poll frame from the AP to the stations wherein the poll frame includes each of the respective time offsets. In another embodiment, the time offsets may be communicated in a setup frame that creates an association between a group of stations and an identifier (e.g., group ID). In this embodiment, the station knows that when it is polled for Group X, it needs to apply the particular time offset that was communicated from the AP.

In an embodiment, the time offset may take the form of a single bit of predefined information (e.g., a delay by 10% of SIFS). In another embodiment, the time offset may take the form of multiple bits representing an amount by which to delay the response. The range for the delay might be SIFS*y, where y is some fixed tolerance that is within the IEEE 802.11 standards.

Each responding station may determine its own nominal response time that has been offset by the received time offset. The AP may then receive PPDU responses from the stations at these times 409.

Figure 5:
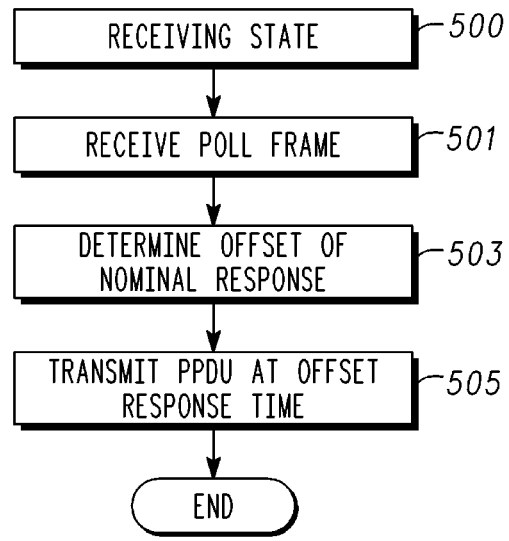
FIG. 5 illustrates a flowchart of an embodiment of a method for transmit time offset in a station of an UL-MU-MIMO wireless system.

FIG. 5 illustrates a flowchart of an embodiment of a method for transmit time offset in a station of an UL-MU-MIMO wireless system. The stations are put into a receiving state 500. They may then receive the poll frame 501 transmitted by the AP. The poll frame may contain the time offset as determined previously.

Each responding station may determine its own nominal response time that has been offset by the received time offset 503. The stations may then transmit PPDU responses to the AP at these times 505.

The above-described methods can be performed dynamically on a packet-by-packet basis. There is no requirement that the time offsets be synchronized in any way.

Figure 6:
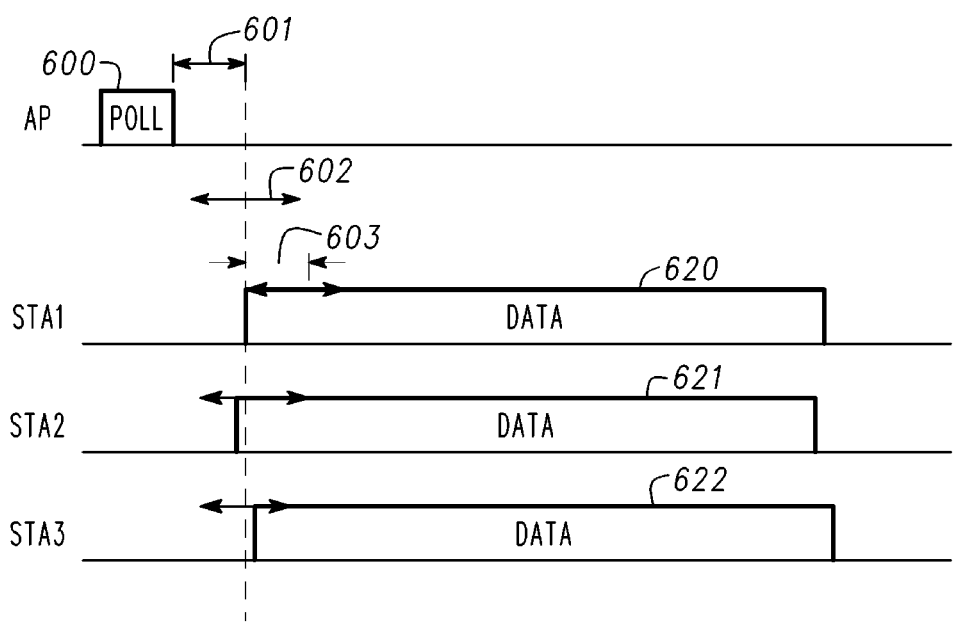
FIG. 6 illustrates a diagram of an AP poll and station response in accordance with the embodiments of FIGS. 4 and 5.

FIG. 6 illustrates a diagram of an embodiment of an AP poll and station response in accordance with various embodiments. The heights of the PPDU responses (e.g., data) 620-621 are indications of their respective signal transmit power relative to the other stations' responses.

The poll frame 600 comprising the time offset is transmitted over the wireless channel to be received by the stations STA1-STA3. Each station may then determine its own respective nominal time to transmit based on the received time offset. For example, since STA1 is the weakest transmitting station (i.e., its received signal at the AP has the lowest SNR), either because it's transmitted signal is weaker or the channel interference is greater than that experienced by the other stations, the PPDU transmission 620 from STA1 is delayed from the SIFS time 601 by the illustrated time offset 603.

Since the remaining stations STA2, STA3 have stronger transmissions (as received by the AP), these stations STA2, STA3 have received time offsets of zero from the AP in the poll frame 600. Thus, these stations STA2, STA3 may transmit their PPDU's 621, 622 at their nominal time, as determined by their own clocks and the SIFS time 601, that is in response to the received poll frame 600.

EXAMPLES

The following examples pertain to further embodiments.

Example 1 is an apparatus including a processor and circuitry to monitor respective transmit powers for a plurality of wireless stations, determine a transmit time offset for a station having a lowest respective transmit power of the plurality of wireless stations, transmit the transmit time offset to the station, and receive data from the station at a time adjusted by the transmit time offset in accordance with a UL-MU-MIMO technique.

In Example 2, the subject matter of Example 1 is further configured to transmit a frame to the plurality of wireless stations wherein the frame comprises a respective transmit time offset for each of the plurality of wireless stations.

In Example 3, the subject matter of Examples 1-2 is further configured to monitor a signal-to-noise ratio (SNR) of a wireless channel between the wireless device and the plurality of wireless stations.

In Example 4, the subject matter of Examples 1-3 is further configured to identify the plurality of wireless stations as a station group.

In Example 5, the subject matter of Examples 1-4 is further configured to transmit a poll frame including respective transmit time offsets for each of the wireless stations in the station group.

In Example 6, the subject matter of Examples 1-5 is further configured to: generate a non-zero transmit time offset for a wireless station having a lower transmit power than other stations of the plurality of wireless stations; and transmit the non-zero transmit time offset to the wireless station having the lower transmit power.

In Example 7, the subject matter of Examples 1-6 further includes wherein the data is received from the plurality of wireless stations in accordance with the UL-MU-MIMO technique during a high efficiency WiFi (HEW) control period during which the AP, operating as a master station, has exclusive use of a channel.

Example 8 is a non-transitory computer-readable storage medium that stores instructions for execution by processing circuitry in controlling a transmit time of stations, the operations to perform the transmit time control: monitor respective transmit powers, over a wireless channel, for a plurality of stations; determine a respective transmit time offset for each station, of the plurality of stations, in response to the respective transmit power of each station; transmit a frame to the plurality of stations wherein the frame includes the respective transmit time offsets for each of the stations; and receive respective data from the plurality of stations at a time adjusted by the respective transmit time offset.

In Example 9, the subject matter of Example 8 further includes wherein the operations to perform the transmit time control further: determine a station of the plurality of stations that has a lowest respective transmit power; and generate a non-zero transmit time offset for the station.

In Example 10, the subject matter of Examples 8-9 further includes wherein the operations to perform the transmit time control further: determine a first station of the plurality of stations that has a lowest respective transmit power; generate a non-zero transmit time offset for the first station; and generate a zero transmit time offset for other stations of the plurality of stations.

In Example 11, the subject matter of Examples 8-10 further includes wherein the operations to perform the transmit time control further: associate the plurality of stations with a group identifier; and transmit the non-zero transmit time offset and the zero transmit time offsets in a poll frame associated with the group identifier.

In Example 12, the subject matter of Examples 8-11 further includes wherein the operations to perform the transmit time control further: receive Physical Layer Convergence Procedure (PLCP) Protocol Data Units (PPDUs) from stations included in the group identifier wherein respective PPDUs are received after a nominal transmit time adjusted for each of the respective transmit time offsets.

In Example 13, the subject matter of Examples 8-12 further includes wherein the operations to perform the transmit time control further initiate a poll exchange sequence.

Example 14 is a method for transmit time offset in a wireless system, the method comprising: monitoring respective transmit powers, over a wireless channel, for a plurality of stations; determining a transmit time offset for a station, of the plurality of stations, in response to the respective transmit power of the station; transmitting the transmit time offset to the station; and receiving data from the station at a time adjusted by the transmit time offset.

In Example 15, the subject matter of Example 14 further includes wherein monitoring the respective transmit powers comprises monitoring a signal-to-noise ratio (SNR) of the wireless channel between each of the plurality of stations and an access point.

In Example 16, the subject matter of Examples 14-15 further includes grouping the plurality of stations of the wireless system into a station group.

In Example 17, the subject matter of Examples 14-16 further includes the transmit time offset to the station comprising transmitting a respective transmit time offset to each of the stations in the station group.

In Example 18, the subject matter of Examples 14-17 further includes transmitting a poll frame including respective transmit time offsets for each of the stations in the station group.

In Example 19, the subject matter of Examples 14-18 further includes: creating an association between the plurality of stations and a group identifier in a setup frame; and transmitting the setup frame including the group identifier and the respective transmit time offsets to the plurality of stations.

In Example 20, the subject matter of Examples 14-19 further includes, receiving data from stations included in the group identifier wherein respective data are received after a nominal transmit time adjusted for each of the respective transmit time offsets.

In Example 21, the subject matter of Examples 14-20 further includes generating a non-zero transmit time offset for the station having a lower transmit power than other stations of the plurality of stations.

In Example 22, the subject matter of Examples 14-21 further includes: determining a station having a highest transmit power of the plurality of stations; and assigning a zero transmit time offset to stations, in the plurality of stations, having a respective transmit power within a predetermined power difference from the highest transmit power.

Example 23 is a method for transmit time offset in an wireless system, the method comprising: a station receiving a frame, from an access point (AP), comprising a transmit time offset associated with a transmit power of the station; determining a transmit time for transmitting data to the AP in response to the frame, the transmit time substantially equal to a nominal transmit time plus the transmit time offset; and transmitting the data to the AP at the transmit time.

In Example 24, the subject matter of Example 23 further includes transmitting Physical Layer Convergence Procedure (PLCP) Protocol Data Unit (PPDU) to the AP at the transmit time.

In Example 25, the subject matter of Examples 23-24 further includes the station receiving a non-zero transmit time offset when a respective transmit power of the station is less than a respective transmit power of other stations in the system.

Example 26 is a system comprising a radio configured to communicate over a channel; a memory to store instructions for execution; and a processor, coupled to the memory and the radio, configured to receive a frame comprising a transmit time offset associated with a transmit power of the station; to determine a transmit time for transmitting data in response to the frame, the transmit time substantially equal to a nominal transmit time plus the transmit time offset; and to control transmission of the data at the transmit time.

In Example 27, the subject matter of Example 26 further includes wherein the channel is an IEEE 802.11ax standard channel.

In Example 28, the subject matter of Examples 26-27 further includes at least one antenna coupled to the radio.

In Example 29, the subject matter of Examples 26-28 further includes wherein the radio is configured to communicate using High-Efficiency Wireless LAN or High Efficiency Wi-Fi (HEW) protocols.

What is claimed is:
1. An apparatus for an access point (AP) a processor and circuitry to:
monitor respective transmit powers for a plurality of wireless stations, determine a transmit time offset for a station having a lowest respective transmit power of the plurality of wireless stations, transmit the transmit time offset to the station, receive uplink data from the station, along with uplink data from other stations of the plurality of wireless stations, at a time adjusted by the transmit time offset in accordance with an uplink multiuser multiple input multiple output (UL-MU-MIMO) technique, determine a station, of the plurality of wireless stations, having a highest transmit power, and assign a zero transmit time offset to stations, of the plurality of wireless stations having a respective transmit power within a predetermined power difference from the highest transmit power, wherein transmission of the transmit time offsets and reception of the uplink data occurs within a transmission opportunity (TXOP) obtained by the AP.

2. The apparatus of claim 1, wherein the apparatus is further configured to transmit a frame to the plurality of wireless stations wherein the frame comprises a respective transmit time offset for each of the plurality of wireless stations, the frame to trigger the reception of the uplink data.

3. The apparatus of claim 1, wherein the apparatus is further configured to monitor a signal-to-noise ratio (SNR) of a wireless channel between the apparatus and the plurality of wireless stations.

4. The apparatus of claim 1, wherein the apparatus is further configured to identify the plurality of wireless stations as a station group.

5. The apparatus of claim 4, wherein the apparatus is further configured to transmit a poll frame including respective transmit time offsets for each of the wireless stations in the station group.

6. The apparatus of claim 1, wherein the data is received from the plurality of wireless stations in accordance with the UL-MU-MIMO technique during a high efficiency WiFi (HEW) control period during which the AP, operating as a master station, has exclusive use of a channel.

7. A non-transitory computer-readable storage medium that stores instructions for execution by processing circuitry of an access point (ALP) in controlling a transmit time of stations, the operations to perform the transmit time control:

monitor respective transmit powers, over a wireless channel, for a plurality of stations;

determine a respective transmit time offset for each station, of the plurality of stations, in response to the respective transmit power of each station wherein a non-zero transmit time offset is assigned to a station having a lowest transmit power of the plurality of stations;

transmit a frame to the plurality of stations wherein the frame includes the respective transmit time offsets for each of the stations;

receive respective uplink data from the plurality of stations at a time adjusted by the respective transmit time offset in accordance with an uplink multiuser multiple input multiple output (UL-MU-MIMO) technique;

determine a station having a highest transmit power of the plurality of stations; and assign a zero transmit time offset to stations, of the plurality of stations, having a respective transmit power within a predetermined power difference from the highest transmit power;

wherein transmission of the transmit time offset and reception of the uplink data occurs within a transmission opportunity (TXOP) obtained by the AP.

8. The non-transitory computer-readable storage medium of claim 7 wherein the operations to perform the transmit time control further:

associate the plurality of stations with a group identifier; and transmit the non-zero transmit time offset and the zero transmit time offsets in a poll frame associated with the group identifier.

9. A method for transmit time offset in a wireless system, the method comprising:

monitoring respective transmit powers, over a wireless channel, for a plurality of stations;

determining a transmit time offset for a station, of the plurality of stations, in response to the respective transmit power of the station, wherein the transmit time offset is a non-zero transmit time offset if the station has the lowest transmit power of the plurality of stations;

transmitting the transmit time offset to the station;

receiving uplink data from the station, along with uplink data from other stations of the plurality of stations, at a time adjusted by the transmit time offset in accordance with an uplink multiuser multiple input multiple output (UL-MU-MIMO) technique;

determining a station having a highest transmit power of the plurality of stations, and assigning a zero transmit time offset to the station having a respective transmit power within a predetermined power difference from the highest transmit power;

wherein transmission of the transmit time offsets and reception of the uplink data occurs within a transmission opportunity (TXOP) obtained by the AP.

10. The method of claim 9, wherein monitoring the respective transmit powers comprises monitoring a signal-to-noise ratio (SNR) of the wireless channel between each of the plurality of stations and an access point.

11. The method of claim 9, further comprising grouping the plurality of stations of the wireless system into a station group.

12. The method of claim 11, wherein transmitting the transmit time offset to the station comprises transmitting a respective transmit time offset to each of the stations in the station group.

13. The method of claim 9, further comprising:

creating an association between the plurality of stations and a group identifier in a setup frame; and transmitting the setup frame including the group identifier and the respective transmit time offsets to the plurality of stations.

14. A method for transmit time offset in a wireless system, the method comprising:

monitoring respective transmit powers, over a wireless channel, for a plurality of stations;

determining a transmit time offset for a station, of the plurality of stations, in response to the respective transmit power of the station by generating a non-zero transmit time offset for the station having a lower transmit power than other stations of the plurality of stations;

transmitting the transmit time offset to the station;

receiving data from the station at a time adjusted by the transmit time offset in accordance with an uplink multiuser multiple input multiple output (UL-MU-MIMO) technique;

determining a station having a highest transmit power of the plurality of stations; and assigning a zero transmit time offset to stations, in the plurality of stations, having a respective transmit power within a predetermined power difference from the highest transmit power.

15. A high-efficiency station (HE-STA) comprising:
a memory for storing instructions; and
a processor coupled to the memory and configured to receive a first frame, from an access point (AP), comprising a transmit time offset associated with a transmit power of the HE-STA wherein the transmit time offset is a non-zero transmit time offset if the transmit power of the HE-STA is a lowest transmit power of a plurality of HE-STAs and the transmit time offset is a zero transmit time offset if the transmit power of the HE-STA is within a predetermined power difference from a highest transmit power of the plurality of HE-STAs; to determine a transmit time for transmitting uplink data in response to the frame, the transmit time equal to a nominal transmit time plus the transmit time offset; and to transmit the uplink data at the transmit time, wherein the transmission of the transmit time offset and the uplink data occurs within a transmission opportunity (TXOP) obtained from the AP.

16. The HE-STA of claim 15, wherein the processor is configured to control transmission of a Physical Layer Convergence Procedure (PLCP) Protocol Data Unit (PPDU) to the AP at the transmit time.

17. The HE-STA of claim 15, wherein the processor is further configured to control receipt of a non-zero transmit time offset when a respective transmit power of the station is less than a respective transmit power of other stations in the system.

18. The HE-STA of claim 15, wherein the channel is an IEEE 802.11ax standard channel.

19. The HE-STA of claim 15, further comprising at least one antenna coupled to the radio.

20. The HE-STA of claim 15, wherein the radio is configured to communicate using High-Efficiency Wireless LAN or High Efficiency Wi-Fi (HEW) protocols.

* * * * *